S. HILL & B. B. PRENTICE.
Milk-Cooler.
No. 207,738. Patented Sept. 3, 1878.
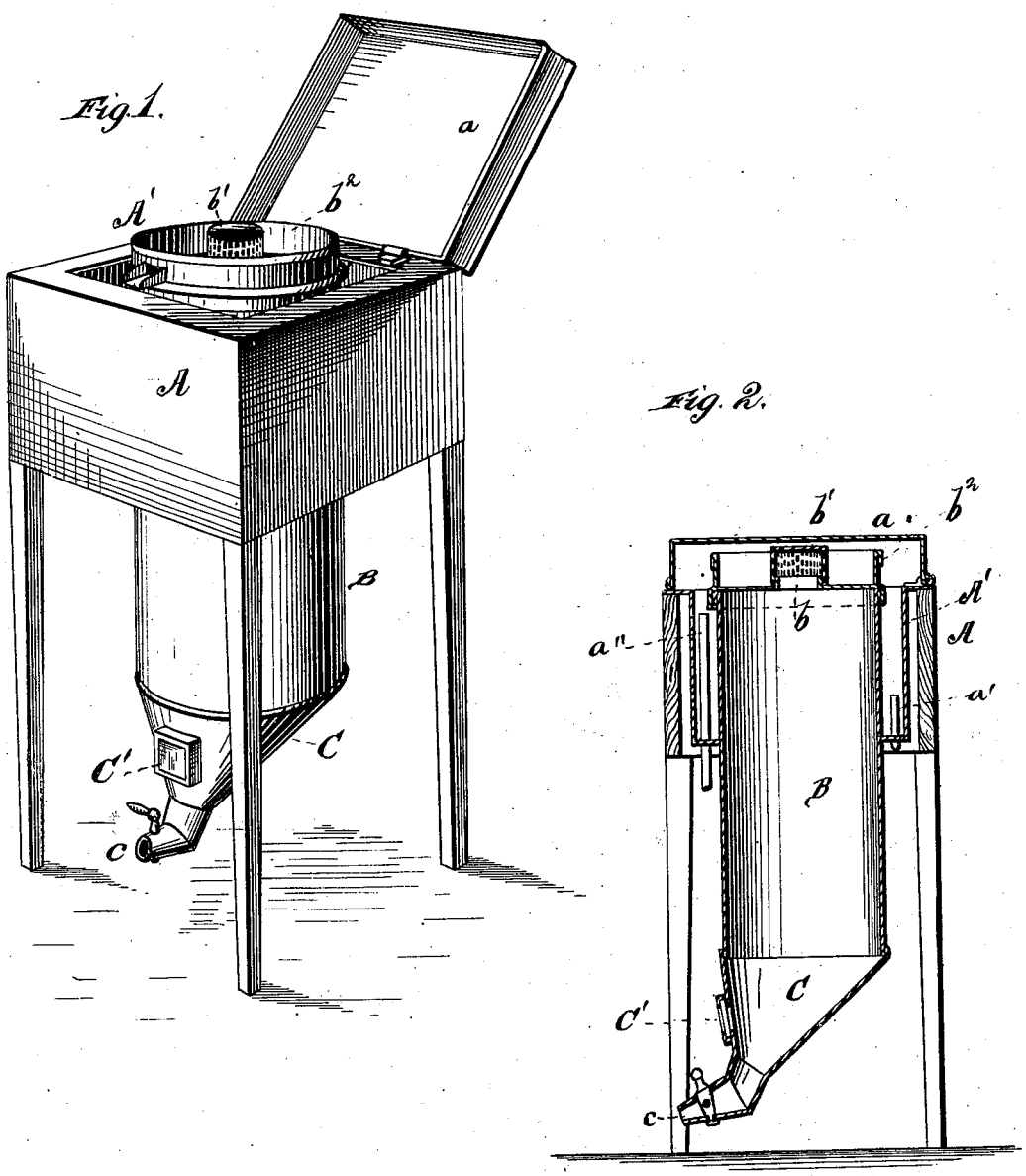
WITNESSES
INVENTORS.

UNITED STATES PATENT OFFICE.

SAMUEL HILL AND BENJAMIN B. PRENTICE, OF GREENSBOROUGH, VT.

IMPROVEMENT IN MILK-COOLERS.

Specification forming part of Letters Patent No. 207,738, dated September 3, 1878; application filed July 13, 1878.

*To all whom it may concern:*

Be it known that we, SAMUEL HILL and BENJAMIN B. PRENTICE, of Greensborough, in the county of Orleans and State of Vermont, have invented a new and valuable Improvement in Milk Cans and Coolers; and we do hereby declare that the following is a full, clear, and exact description of the construction and operation of the same, reference being had to the annexed drawings, making a part of this specification, and to the letters and figures of reference marked thereon.

Figure 1 of the drawings is a perspective view of our milk can and cooler, and Fig. 2 is a vertical central sectional view of the same.

The nature of our invention relates to a can for cooling milk and perfectly and quickly forming cream.

The invention consists in a cylindrical can having a conical bottom, the upper part of said cylinder being surrounded with a square ice-box or water-tank, provided with an aperture, which is covered with a perforated cap to afford ventilation. The water-tank is provided with an inlet and an outlet tube, the open top of the outlet being elevated to near the top of the tank. A hinged cover operates over the whole, and suitable legs are provided.

Near the bottom of the conical portion is a window, which allows inspection of the contents of the can, and a stop-cock at the lower extremity serves to draw off the same, when desired.

The conical bottom serves to deflect and precipitate dirt to the small end, from whence it is readily removed through the stop-cock.

The can being suspended in the tank allows the water or ice to be applied to the upper part of the can, while the lower part being exposed to the warmer atmosphere of the room causes the cream to rise rapidly and completely, and after it has risen it is kept cool by the surrounding ice or water.

After the cream has sufficiently risen the milk may be drawn off through the stop-cock until the cream is discernible through the window, and then the cream may be drawn off in another vessel.

Referring to the drawing, A represents a square water or ice tank, such ice or water chamber being shown at A'. This tank is supported on proper legs or supports, and the ice-chamber A' is provided with water-inlet $a'$ and outlet $a''$. A hinged cover, $a$, covers the chamber A'.

B represents a cylindrical can suspended within the tank, a portion of it extending below. This cylinder has an inlet-orifice in the top at $b$, covered by perforated cap $b^1$, through which the cream-chamber is ventilated. A collar, $b^2$, extends above the top of the cylinder, and it is provided with a sluice, which allows any spilled milk to run out, and the collar prevents water from running in.

At the lower end of the cylinder B is the conical portion C, having a stop-cock, $c$, at the lower or smaller end for drawing off the contents of the can, and a window, C', framed therein for inspecting such contents.

The operation of our invention, from the foregoing description, is obvious, and the advantages apparent.

What we claim as new, and desire to secure by Letters Patent, is—

The cylindrical can B, having ventilated orifice $b$ $b^1$ and cone C, in combination with and partially surrounded by the ice or water tank A A', as and for the purpose set forth.

In testimony that we claim the above we have hereunto subscribed our names in the presence of two witnesses.

SAMUEL HILL.
    BENJAMIN B. PRENTICE.

Witnesses:
    JOHN H. GEORGE,
    EDMUND H. GEORGE.